United States Patent [19]

Takeuchi et al.

[11] Patent Number: 4,510,201

[45] Date of Patent: Apr. 9, 1985

[54] POLYVINYL CHLORIDE RESINOUS MOLDED SHEET PRODUCT

[75] Inventors: Tooru Takeuchi, Settsu; Masaru Nakamura, Hirakata; Eiji Aoishi, Settsu, all of Japan

[73] Assignee: Kanegafuchi Kagaku Kogyo Kabushiki Kaisha, Osaka, Japan

[21] Appl. No.: 386,184

[22] Filed: Jun. 7, 1982

[30] Foreign Application Priority Data

| Jun. 9, 1981 | [JP] | Japan | 56-88966 |
| Jun. 9, 1981 | [JP] | Japan | 56-88967 |
| Jun. 22, 1981 | [JP] | Japan | 56-97272 |
| Aug. 24, 1981 | [JP] | Japan | 56-133171 |

[51] Int. Cl.³ .............. B32B 27/22; B32B 27/30; B32B 5/18

[52] U.S. Cl. .................. 428/285; 428/286; 428/313.3; 428/316.6; 428/318.6; 428/319.9

[58] Field of Search .......... 428/313.3, 313.5, 313.7, 428/313.9, 338, 402, 240, 284, 241, 285, 242, 286, 244, 246, 283, 318.6, 316.6, 319.3, 319.9, 327, 407; 523/218, 219, 220; 524/1

[56] References Cited

U.S. PATENT DOCUMENTS

| 2,677,622 | 5/1954 | Schouteden | 428/240 |
| 3,003,576 | 10/1961 | Dodge | 428/316.6 |
| 3,152,002 | 10/1964 | Wisotzky et al. | 428/240 |
| 3,336,180 | 8/1967 | Werner | 428/318.6 |
| 3,348,991 | 10/1967 | Abell et al. | 428/316.6 |
| 3,353,981 | 11/1967 | Jacob | 428/240 |
| 3,501,370 | 3/1970 | Juredine | 428/318.6 |
| 4,018,962 | 4/1977 | Pedlow | 428/327 |
| 4,058,471 | 11/1977 | Glatti et al. | 523/220 |
| 4,284,681 | 8/1981 | Tidmarsh et al. | 428/246 |

*Primary Examiner*—William J. Van Balen
*Attorney, Agent, or Firm*—Armstrong, Nikaido, Marmelstein & Kubovcik

[57] ABSTRACT

Disclosed are polyvinyl chloride resinous compositions containing cellular fillers such as Silus Balloon and pearlite and molded products prepared by subjecting the compositions to heating at an increased pressure. The molded products may be combined with a core layer such as a non-woven fabric and a victria lawn, a foamed layer such as PVC paste resinous foam, a surface layer such as a non-foamed synthetic resin and molded into laminated sheet products. Those are made lighter and superior in soundproof and adiabatic effects, bending strength, dry touchness, water resistance, dimensional stability, cold resistance and the like so that structural materials such as floor coverings and the like are supplied more advantageously as compared with conventional ones.

13 Claims, 8 Drawing Figures

POLYVINYL CHLORIDE RESINOUS MOLDED SHEET PRODUCT

BACKGROUND OF THE INVENTION

1. Field of the Invention

The present invention relates to a light composition of polyvinyl chloride resin and molded products thereof. More particularly, it relates to a polyvinyl chloride resinous composition comprising, as main ingredients, a polyvinyl chloride resin and a cellular filler and to molded products obtained by heating said composition at an increased pressure.

2. Description of the Prior Art

Polyvinyl chloride resins like vinyl chloride paste resins (hereinafter referred to as PVC resin) are normally in widespread use as a plastisol obtained by being mixed with a plasticizer, a stabilizer, pigments, fillers, diluents and the like, or as an organosol by being mixed with a plasticizer, a stabilizer, a solvent and the like.

Conventionally, these PVC plastisol and organosol exhibit a specific gravity of 1.0 or more and an average specific gravity of about 1.2, when such a PVC resin with a specific gravity of about 1.4 and a plasticizer with a specific gravity ranging from about 0.9 to about 1.0 are used.

In recent years such a plastisol and an organosol are widely used in a variety of fields including walls, floor and table coverings, book covers, decorative containers, upholsteries, automobile interiors, toys, leathers, sealants, sails, crown caps and the like.

In the field of floor coverings, however, as backings for floor coverings, asbestos papers, or glass fibre non-woven fabrics impregnated or coated with a PVC paste sol, or non-woven fabrics of glass fibres or synthetic fibres such as polyester and nylon impregnated or coated with such as SBR and polyvinyl alcohol have been used. Among those, backings of asbestos papers exhibit an exceedingly high percentage but there are included numerous problems and deficiencies including public hazards and a danger to heath recently presented, peeling off at the time of re-covering, waste disposal of used floor coverings, and a fatal defect that when applied to the floor bending toward the inside at an angle greater than 90 degrees, backings are broken though the upper portions of floor coverings themselves can stand, to thereby decrease the commercial value dreadfully. Moreover the floor coverings themselves are water-proof, but the backings of asbestos papers are inferior in water-proof property with a result that a range of fields usable is unavoidably limited. In view of the foregoing numerous drawbacks, there is a strong need for floor coverings eliminating such drawbacks.

Although, on the other hand, glass fibre or synthetic fibre non-woven fabrics, those coated or impregnated with a PVC plastisol, or those to which sheets of plasticized plastics having a thick tissue construction containing a filler in large quantities are joined as disclosed in the Japanese Patent Examined Publication No. 41848/1972 are, in fact, improved in many respects as compared with asbestos papers, the glass fibre non-woven fabrics expose glass fibre per se to thus adhere to workers and stab them in the skin while applied or transported. Further those are also weak in bending strength, to thus result in a decrease in commercial value. The backings such as those disclosed in the Japanese Patent Examined Publication No. 41848/1972 or non-woven fabrics coated or impregnated with a PVC plastisol, though improved in respects of stab in the skin, bending strength, peeling off and the like, still possess adhesiveness peculiar to the PVC plastisol and are heavy in weight, and accordingly difficult to handle especially at the time of transportation and application. Furthermore those coated or impregnated with the PVC plastisol have a difficulty in bonding when applied to the floor, and can only be applied by the selection of limited kinds of adhesives, which is a defect peculiar to a plasticized PVC resin. Eventually in some instances, those are applied to the floor by bonding thereto victria lawns and synthetic fibre non-woven fabrics and the like in order to improve such deficiencies.

In an attempt to save the weight of the PVC sol, foaming processes, either by mechanical or by chemical, have been proposed. According to those processes, notwithstanding that lightening of molded products is assuredly achieved in the long run, compressive elasticity, tensile strength, tear strength and dimensional stability are drastically reduced, hence being not satisfactory in practical usefulness.

SUMMARY OF THE INVENTION

It is therefore an object of the present invention to provide a PVC resinous composition made light having superior properties, when molded into structural materials like backings for floor coverings.

It is another object of the present invention to provide a PVC resinous molded product obtained by heating at an increased pressure said PVC resinous composition made light with superior properties.

It is still another object of the present invention to provide a PVC resinous molded product free from public hazards caused by the use of asbestos, and improved in respects of peeling off upon re-covering as well as waste disposal.

It is a further object of the present invention to provide a PVC resinous molded product which is convenient in handling and application and selects no specific adhesives.

It is a still further object of the present invention to provide a PVC resinous molded product superior in flexibility, dimensional stability and water-proof property, free from a disagreeable adhesiveness.

These and other objects of the present invention together with the advantages thereof will become apparent to those skilled in the art from the detailed disclosure of the present invention as set forth hereinbelow.

The foregoing objects are accomplished by a polyvinyl chloride resinous composition comprising as main ingredients a PVC resin, and a cellular filler and molded products obtained by heating the same at an increased pressure.

BRIEF DESCRIPTION OF THE DRAWINGS

FIG. 1 to FIG. 8 are schematic representations illustrating embodiments of molded products of the present invention.

DETAILED DESCRIPTION OF THE INVENTION

The present invention is to primarily provide a polyvinyl chloride resinous composition comprising as main ingredients PVC resin and a cellular filler which has a specific gravity of about 0.01 to about 0.8, preferably about 0.1 to about 0.5 and an average size of about 1.0 to about 2000μ, preferably about 1.0 to about 600μ. To this blending, plasticizers, stabilizers, and further pigments, dyes and active surface agents, if necessary, are added and mixed uniformly by dry-blending, to thereby provide a light compound.

Where a cellular filler has been heretofore added to a paste sol compound, it is difficult to provide a plastisol since absorption of the plasticizer is vigorous because of the cellular filler being broken into the mixture, and when it is intended to daringly produce a sol a great amount of solvents has to be used. Still worse, the cellular filler added to make the compound light is broken out so that the desired purpose cannot be attained with a result that the specific gravity of the compound becomes approximately 1.2 times of that of a normal plastisol.

A series of studies have been made from extensive and various points, apart from a conventional PVC paste sol, by the present inventors, and have found that a polyvinyl chloride resinous composition made light, having a freeflow property in a state of powder and suitable for the molding by heating at an increase pressure can be obtained by dry-blending a PVC resin, a plasticizer, a stabilizer and a cellular filler to provide uniform blending of the foregoings, without causing destruction of the cellular filler.

The PVC resin used in the present invention comprises polymers of vinyl chloride and copolymers of vinyl chloride and at least one of other monomers copolymerizable therewith which are selected from the group consisting of vinyl esters such as vinyl acetate and vinyl propionate, acrylic or methacrylic esters, and olefinic monomers such as ethylene and propylene, having an average particle size ranging from about 0.2 to about 200μ. Among those, PVC paste resin with particle size ranging from 0.2 to 50μ is favourably employed as a main ingredient attributed from the excellent forming properties of the dry-blended composition when subjected to heat and pressure. Of course, PVC resins with particle size more than 50μ can be mixed therewith to the extent that forming under heat and pressure is feasible. Within the scope of the present invention to give preferable dry-blended composition subjected to molding, the present invention may further include the cases where, in addition to PVC resin, an olefinic polymer such as polyethylene and polypropylene, an acrylic polymer such as polymethyl methacrylate and polybutyl acrylate, a rubber-like substance such as NBR and SBR, a polymer comprising acrylonitrile as a major ingredient, a vinyl polymer such as vinyl fluoride and vinyl bromide, a thermoplastic elastomer such as a copolymer of ethylene and vinyl acetate and the like are mixed to provide a PVC resinous composition.

The cellular filler used in the present invention may include, as inorganic materials, "Alumina Babble" (trademark, produced by Showa Denko K.K.), "Kernamite" (English name is not known, produced by J. D. Mclaughlin), "Senospheres" (English name is not known, produced by A. A. Johnson), "Silus Balloon" (trademark, Kyushu Kogyo Shikenjo), "Silica Balloon" (trademark, produced by Shikoku Kaken K.K.), "Dia Balloon" (trademark, produced by Japan Metals & Chemicals Co., Ltd.), "Microballoon" (trademark, produced by Emerson and Cuming), pearlite and the like, which are made of alumina, shale, fly ash, silus, silica sand, volcanic rock, sodium silicate, borax, pearlite, obsidian and the like.

As the organic cellular filler, on the other hand, there may be included "Phenolic Microballoon" (trademark, produced by U.C.C.), "Salan Microspheres" (trademark, produced by Dow Chemical), "Eccospheres EP" and "Eccospheres VF-0" (trademarks, produced by Emerson & Cuming) and the like, which are made of phenolic resin, polyvinyliden chloride, epoxy resin and urea resin. There may be further included cellular fillers made of sinters of "Phenolic Microballoon", pitches and the like such as "Carbo Spheres" (trademark, produced by General Technology), "Kureca Spheres" (English name and a manufacturer are not known).

Among the foregoing cellular fillers, inorganic cellular fillers are preferred to use in the present invention, especially "Silus Balloon", "Dia Balloon", "Microballoon" and pearlite are more preferred. These are employed singly or in combination of two or more. To the PVC resinous composition containing the cellular fillers, other normal fillers may further be added, for instance, enhancing the strength of the molded products by adding, for example, glass fibre, asbestos or the like.

The plasticizer used in the present invention may include plasticizers generally used in polyvinyl chloride such as esters of phthalic acid, esters of fatty acid, esters of phosphoric acid, polyester plasticizers, epoxy plasticizers, chlorinated paraffins and the like. An amount used of the plasticizer is in a range of from about 20 to about 100 parts by weight, more preferably about 40 to about 80 parts by weight per 100 parts by weight of the PVC resin.

Dry-blending of the ingredients is carried out at a temperature from room temperature to about 100° C., more preferably about 50° to 80° C. by the use of a suitable blending machine such as a Henshel mixer, a "Super Mixer" (trademark, produced by Kawata Seisakusho), a ribbon blender and the like. The PVC resinous compositions obtained by dry-blending according to the present invention possess superior powder properties suitable for powder molding, especially a moderate free-flow property.

As stated earlier, the present invention is characterized by dry-blending a PVC resin and a cellular filler so that even a PVC paste resin containing a small particle size of about 1μ is possible to be dry-blended, thus permitting the use of a wide range of an average particle size of from about 0.2 to about 50μ.

As apparent from the foregoing, PVC resinous compositions of the present invention which are made light and have a free-flow property exhibit unique properties that have never been obtained by a conventional plastisol or organosol, by far superior in particular in powder molding, and accordingly those are in a wide use in various fields including, for example, floor coverings, walls, automobile parts, toys, sealants and sails, as set forth above.

Those compositions thus obtained exhibiting a superior free-flow property in a state of powder may be heated at an increased pressure to be formed into a sheet, by the use of which as a basis of structural materials a variety of molded products are supplied.

The so obtained PVC sheet is used solely with its surface processed as, for instance, a floor covering, but is also used as a laminated product by combining the sheet with a core layer such as victoria lawns, glass fibre or synthetic fibre non-woven fabrics, a foamed layer and a surface layer (skin layer). When the foregoing molded products are used as, for instance, a floor covering backing, not only is the backing made light drastically, but peeling off upon re-covering and bending strength can be markedly improved to such a degree to enable folding covering. In addition, the covering of the present invention does not select the kind of adhesives when applied to a floor and is superior in a water-proof property so that it is possible to apply it to watery places. Moreover it is free from a disagreeable adhesiveness peculiar to a plasticized vinyl product containing a great amount of plasticizers and superior in dry touchness, besides possessing characteristics conventional backings have.

Incidentally, the properties of the floor covering of the present invention are compared with those of the floor covering (plasticized plastic layer of a thick tissue) disclosed in the Japanese Examined Publication No. 41848/1972 and the obtained results are given in Table 1.

TABLE 1

| Performances | Floor Covering of the Present Invention | Japanese Patent Examined Publication No. 41848/1972 |
| --- | --- | --- |
| Specific gravity | 1 > (0.5~0.8) | 1 < (1.25~1.8) |
| Weight | Light | Heavy |
| Touchness | Dry touch | Wet and adhesive |
| Bonding when applied | No selection of adhesives | Only adhesives for plasticized vinyls |
| Handling | Easy | Difficult in transportation |
| Soundproof effect | Good | Not good |
| Adiabatic effect | Good | Not good |

It is understood from Table 1 that the floor covering of the present invention is superior in all performances to that of the Japanese Patent Examined Publication No. 41848/1972.

According to the present invention, as apparent from the foregoing, various floor coverings are provided which were made light, superior in flexibility, bending strength, dimensional stability, water resistance property and further improved in adhesiveness peculiar to plasticized plastics by blending PVC paste resin, a cellular filler, a plasticizer and a thermal stabilizer, furthermore, if necessary, pigments, dyes, diluents, surface active agents and the like, then optionally combining the resulting blend with a core layer such as victria lawns and non-woven fabrics, a non-foamed layer such as a transparent PVC paste sol or a plasticized plastic film, a foamed layer and the like, to thereby form those into a sheet product.

Figure 1:
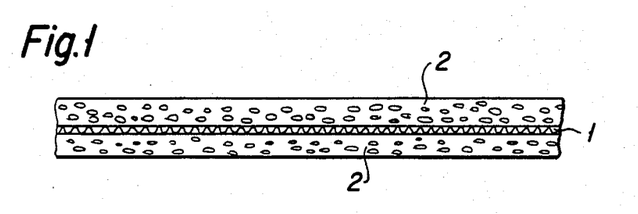
FIG. 1 illustrates a molded sheet product in which a core layer is interposed.

An example is a molded sheet product which comprises a sheet product 2 obtained by subjecting a resinous composition of the present invention to heating at an increased pressure and a core layer 1 embedded in said sheet product, comprising such as a glass fibre non-woven fabric, a synthetic fibre non-woven fabric or a victoria lawn.

Figure 2:
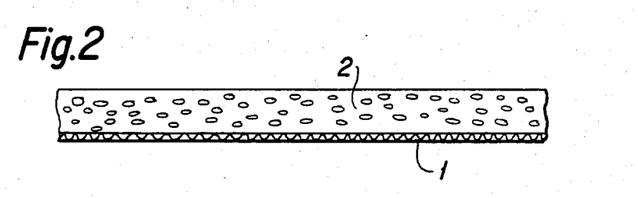
FIG. 2 depicts a molded sheet product, to one side of which a core layer is provided.

Another example is a molded sheet product which comprises the core layer 1 comprising such as a glass fibre non-woven fabric, a synthetic fibre non-woven fabric or a victoria lawn is provided on the one or both sides of said sheet product 2.

Figure 3:
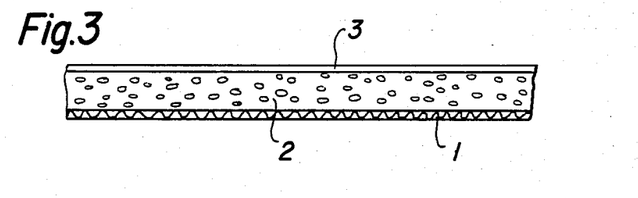
FIG. 3 shows a molded sheet product comprising a surface layer, a molded sheet and a core layer, molded in a body.

A third example is a molded sheet product in which on the one side of said sheet product 2 the core layer 1 comprising such as a glass fibre non-woven fabric, a synthetic fibre non-woven fabric and a victoria lawn is provided, and on the other side a surface layer 3 comprising such as a non-foamed synthetic resinous layer is provided.

Figure 4:
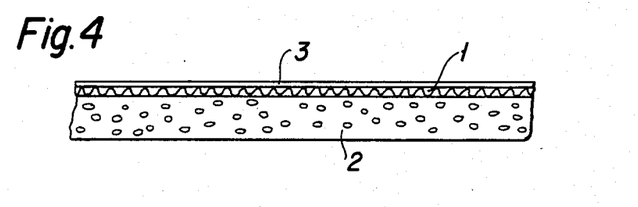
FIG. 4 is illustrative of a molded sheet product comprising a surface layer, a core layer and a molded sheet, molded in a body.

A fourth example is a molded sheet product in which on said sheet product 2 the core layer 1 comprising such as a glass fibre non-woven fabric, a synthetic fibre non-woven fabric and a victria lawn is provided, and on the core layer is further provided the surface layer 3 comprising such as a non-foamed synthetic resinous layer.

Figure 5:
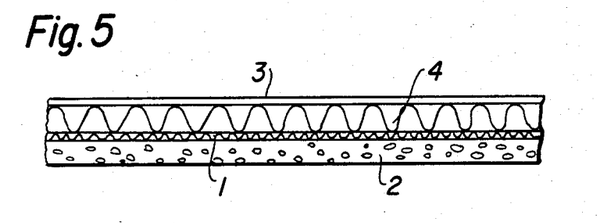
FIG. 5 is a molded sheet product comprising a surface layer, a foamed layer, a core layer and a molded sheet, molded in a body.

A fifth example is a molded sheet product in which on said sheet product 2 the core layer 1 comprising such as a glass fibre non-woven fabric, a synthetic fibre non-woven fabric and a victoria lawn is provided, on the core layer a foamed layer 4 comprising polyvinyl chloride paste resinous foam is provided, and on the foamed layer 4 the surface layer 3 comprising such as a non-foamed synthetic resinous layer is further provided.

Figure 6:
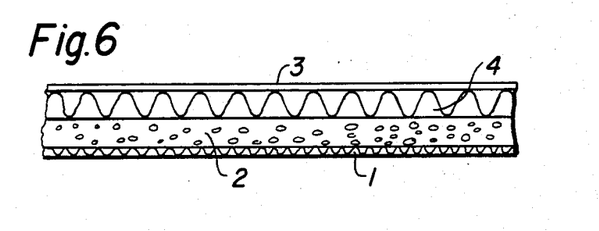
FIG. 6 shows a molded sheet product comprising a surface layer, a foamed layer, a molded sheet and a core layer, molded in a body.

A sixth example is a molded sheet product in which on the core layer 1 comprising such as a glass fibre non-woven fabric, a synthetic fibre non-woven fabric and a victoria lawn, said sheet product 2 is provided, on the sheet product 2 the foamed layer 4 comprising such as polyvinyl chloride paste resinous foam is provided, and on the foamed layer 4 is further provided the surface layer 3 comprising such as a non-foamed synthetic resin.

Figure 7:
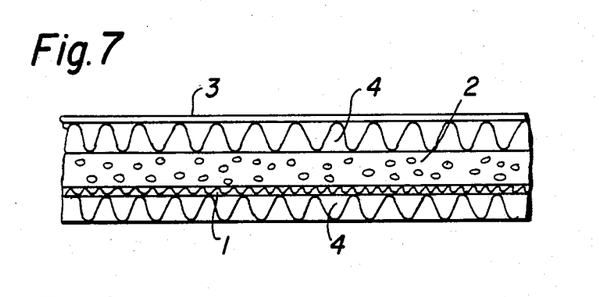
FIG. 7 is a molded sheet product comprising a surface layer, a foamed layer, a molded sheet, a core layer and a foamed layer, molded in a body.

A seventh example is a molded sheet product in which on the core layer 1 comprising such as a glass fibre non-woven fabric, a synthetic fibre non-woven fabric and a victoria lawn, said sheet product 2 is provided, on the both sides of the obtained composite, foamed layers 4 are provided respectively, furthermore, on the foamed layer 4 in contact with said sheet product 2 is provided the surface layer 3 comprising such as a non-foamed synthetic resin.

Figure 8:
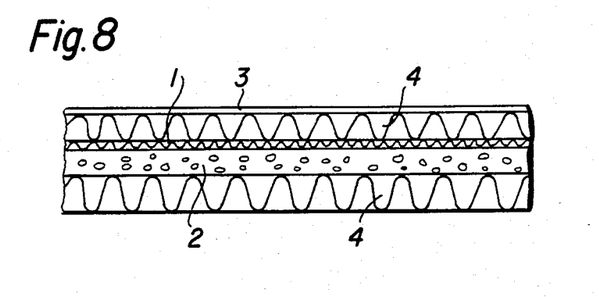
FIG. 8 exhibits a molded sheet product comprising a surface layer, a foamed layer, a core layer, a molded sheet and a foamed layer, molded in a body.

A eighth example is a molded sheet product in which under the core layer 1 comprising such as a glass fibre non-woven fabric, a synthetic fibre non-woven fabric and a victoria lawn, said sheet product 2 is provided, on the both sides of the resulting composite, foamed layers 4 are provided respectively, on the foamed layer 4 in contact with the core layer 1 is further provided the surface layer 3 comprising such as a non-foamed synthetic resin.

In the molded sheet products of the present invention, said sheet product has desirably the thickness of about 0.1 to about 5 mm, more desirably about 0.3 to about 3 mm, though not prevented to have the thickness exceeding the above range.

As the core layer used in the present invention, non-woven fabrics such as a glass fibre or a synthetic fibre, and a victoria lawn are used which have superior dimensional stability, among which the victoria lawn is preferred to use. The core layer should desirably have a density ranging from about 30 to about 200 g/m².

As the surface layer (skin layer) used in the present invention, a non-foamed synthetic resinous layer is preferred to use, which is produced by providing a non-foamed PVC sol layer, then molding it by heating, or by heat fusing or bonding a soft plastic film such as a PVC sheet, a polyethylene film and the like. The thickness of the surface layer is preferable in a range of from about 0.1 to about 2.0 mm, more preferable about 0.2 to about 0.5 mm.

The foamed layer is produced by, for example, coating of a PVC plastisol containing a blowing agent such as azodicarbonamide and oxybissulfonyl hydrazide, then allowing it to foam and gel by heating. The degree of foaming is preferable in a range of from about 2.5 to about 4 times of the original volume (the density of the foamed layer is approximately in a range of from about 0.3 to about 0.5). The thickness of the foamed layer is optionally selected from a range of from about 0.3 to about 2 mm, more preferably, about 0.7 to about 1.5 mm. Moreover the foamed layer may also be prepared by the coating of a mechanically foamable sol, not limited to a process using chemical blowing agents.

Hereinafter the present invention will be described in more detail by way of examples that follow, to which examples the present invention is not limited.

EXAMPLE 1

| | |
|---|---|
| PVC paste resin ($\bar{p}$ = 800, Average particle size: 1μ) | 100 parts by weight |
| D.O.P. | 40 |
| Silus Balloon (Apparent specific gravity: 0.14~0.32) (SANKILITE-Y) (produced by Sanki Kogyo K.K.) | 50 |
| Stabilizer (Ca—Zn) | 8 |

The foregoing composition was dry-blended by the use of a domestic juicer mixer to obtain a compound. The obtained compound had an apparent specific gravity of 0.53 and was superior in powder properties, especially in a free-flow property.

EXAMPLE 2

| | |
|---|---|
| PVC paste resin (VAc-Vcl copolymer, $\bar{p}$ = 1200, Average Particle size: 1μ) | 100 parts by weight |
| D.O.P. | 50 |
| Silus Balloon (SANKILITE-Y) | 100 |
| Stabilizer (Ca—Zn) | 3 |

The foregoing composition was subjected to dry-blending in a similar fashion to that of Example 1, preparing a compound. An apparent specific gravity of the compound was 0.40 and exhibited a good free-flow property.

COMPARATIVE EXAMPLE 1

| | |
|---|---|
| PVC paste resin (Vcl homopolymer, $\bar{p}$ = 1700, Average particle size: 1μ) | 100 parts by weight |
| D.O.P. | 60 |
| Silus Balloon (SANKILITE-Y) | 50 |
| Stabilizer (Ca—Zn) | 3 |
| Diluent (Mineral turpentine) | 10 |

The composition as aforesaid was blended by the use of an Ishikawa style grinder. As a result, Silus Balloon was broken out and thus liquid ingredients were absorbed, thereby a/paste-like compound with a very high viscosity being prepared. The resulting compound had a specific gravity of 1.1, exhibited no fluidity and thus could not be used practically.

EXAMPLE 3

| | |
|---|---|
| PVC paste resin (Vcl homopolymer, $\bar{p}$ = 1700, Average particle size: 3μ) | 100 parts by weight |
| T.C.P. (Tricresyl phosphate) | 55 |
| NB-20 (DOP containing 20% of NBR) | 10 |
| Silus Balloon (SANKILITE-Y) | 100 |
| Stabilizer (Ba—Zn) | 3 |

By using a Henshel style mixer the foregoing composition was dry-blended to prepare a compound. The resultant compound showed an apparent specific gravity of 0.45 and satisfactory powder properties including a free-flow property.

EXAMPLE 4

| | |
|---|---|
| PVC (Vcl homopolymer, Average particle size: 30μ) | 100 parts by weight |
| DOP | 50 |
| Pearlite (Apparent specific gravity: 0.04~0.2, Average particle size: 150μ, produced by Mitui Mining & Smelting Co., Ltd.) | 50 |
| Stabilizer (Ba—Zn) | 3 |

The above composition was subjected to dry-blending using a Henshel mixer to obtain a compound, which showed an apparent specific gravity of 0.52 and good powder properties.

EXAMPLE 5

| | |
|---|---|
| PBM-11 (Vcl-VAc copolymer, $\bar{p}$ = 1000, Average particle size: 50μ) (produced by Kanegafuchi Chem. Ind. Co., Ltd.) | 100 parts by weight |
| D.O.P. | 40 |
| Silus Balloon (SANKILITE-Y) | 50 |
| Stabilizer | 3 |

By dry-blending of the foregoing composition by the use of a Henshel style mixer, a compound was produced which had an apparent specific gravity of 0.50 and was superior in powder properties.

EXAMPLE 6

| | |
|---|---|
| PVC (Vcl homopolymer, Average particle size: 30μ) | 50 parts by weight |
| PVC (Vcl-VAc copolymer, $\bar{p}$ = 800, Average particle size: 120μ) | 50 |
| D.O.P. | 50 |
| Silus Balloon (SANKILITE-Y) | 50 |
| Stabilizer | 3 |

The foregoing composition was dry-blended by a Henshel mixer to thus prepare a compound. The obtained compound exhibited an apparent specific gravity of 0.52 and good powder properties.

EXAMPLE 7

| | |
|---|---|
| PBM-11 (Vcl-VAc copolymer, $\bar{p}$ = 1000, Average particle size: 50μ) | 50 parts by weight |
| PVC (Vcl-VAc copolymer, $\bar{p}$ = 800, Average particle size: 120μ) | 50 |
| Silus Balloon (SANKILITE-Y) | 50 |
| Stabilizer | 3 |

By dry-blending the composition as aforesaid a compound was provided, an apparent specific gravity of which was 0.52, exhibiting superior powder properties.

EXAMPLE 8

| | |
|---|---|
| PCH-12 (Vcl-VAc copolymer, $\bar{p}$ = 1400, Average particle size: 1μ) (produced by Kanegafuchi Chem. Ind. Co., Ltd.) | 100 parts by weight |
| DOP | 50 |
| Silus Balloon (SANKILITE-Y) | 100 |
| Stabilizer (Ca—Zn) | 3 |

The foregoing compound was dry-blended by the use of a Henshel style mixer to obtain a compound having a superior free-flow property. The compound thus obtained was applied by powder coating to a release paper in a thickness of about 0.7 mm and subjected to the treatment for 2 minutes at 190° C. under a pressure of 15 Kg/cm². As such, a very light sheet product with a specific gravity of 0.7, superior in dry touchness and flexibility was provided. The sheet product had tensile strength of 15 Kg/cm² and elongation of 90%.

EXAMPLE 9

| | |
|---|---|
| PSH-10 (Vcl homopolymer, $\bar{p}$ = 1700, Average particle size: 1μ) (produced by Kanegafuchi Chem. Ind. Co., Ltd.) | 100 parts by weight |
| TCP (Tricresyl phosphate) | 55 |
| Pearlite (Apparent specific gravity: 0.4~0.2, Average particle size: 150μ) (produced by Mitsui Mining and Smelting Co., Ltd.) | 100 |
| Stabilizer (Ba—Zn) | 3 |

The compound as aforesaid was dry-blended in a similar fashion to that of Example 8, thus preparing a compound with a good free-flow property. The powder coating of the obtained compound was uniformly made on a ferro type plate in a thickness of 0.6 mm, on the surface of which a glass fibre non-woven fabric was heaped up, then being subjected to the treatment for 5 minutes at 180° C. under a pressure of 10 Kg/cm². The so obtained sheet product had a specific gravity of 0.65, being superior in dry touchness, flexibility and lightness. The glass fibre non-woven fabric was perfectly united to the compound, having an adequate bonding strength, and accordingly being useful as a floor covering backing. The sheet product exhibited tensile strength of 150 Kg/cm² and elongation of 5%.

EXAMPLE 10

| | |
|---|---|
| PSL-6 (Vcl homopolymer, $\bar{p}$ = 1000, Average particle size: 1μ) (produced by Kanegafuchi Chemical Ind. Co., Ltd.) | 70 parts by weight |
| PBM-11 (Vcl-VAc copolymer, $\bar{p}$ = 1100, Average particle size: 50μ) (produced by the foregoing company) | 30 |
| Chlorinated paraffin (containing 45% of chlorine) | 60 |
| Dia Balloon (Apparent specific gravity: 0.12~0.15, Average particle size: 180μ) (produced by Japan Metals & Chemicals Co., Ltd.) | 50 |
| Microballoon (Apparent specific gravity: 0.16~0.2, Average particle size: 10μ) (produced by Emerson & Cuming) | 50 |
| Stabilizer (Barium stearate) | 5 |

The above composition was subjected to dry-blending in a similar manner to that of Example 8 to thus obtain a compound superior in a free-flow property. On a victoria lawn located on a ferro type plate the compound was applied, then heated at 190° C. at a pressure of 10 Kg/cm² for 4 minutes to provide a sheet product. The so obtained sheet product had a specific gravity of 0.68 and was superior in lightness, dry touchness and flexibility. Bonding force of the compound and the victoria lawn was sufficient and the sheet product showed tensile strength of 100 Kg/cm² and elongation of 4%. Besides those, tear strength was also satisfactory for use as a floor covering backing.

COMPARATIVE EXAMPLE 2

| | |
|---|---|
| PSH-10 (Vcl homopolymer, $\bar{p}$ = 1700, Average particle size: 1μ) | 100 parts by weight |
| DOP | 100 |
| Calcium carbonate (Average particle size: 2.1μ) | 150 |
| Stabilizer (Ba—Zn) | 3 |

The aforesaid composition was blended by Ishikawa style grinder to provide a plastisol. The obtained plastisol was applied by coating onto a glass fibre non-woven fabric in a thickness of 0.5 mm and subjected to gellation for 5 minutes at 200° C. The same product as described in the Japanese Patent Examined Publication No. 41848/1972 was produced. The product possessed a specific gravity of 1.6 and was satisfactory in flexibility, tensile strength and tear strength in use for a floor covering backing. Notwithstanding, the product exhibited strong adhesiveness because of high content of a plasticizer and was very heavy owing to thick tissue of the coated plastisol, which was basically different in performances from backings of the present invention.

EXAMPLE 11

As illustrated in FIG. 1, the same composition as used in Example 8 was applied by powder coating onto a release paper or a steel belt, into which coating layer a core layer is inserted, thereby those being heated at an increased pressure to be formed into a laminated sheet product comprising a sheet 2 of the composition and the core layer 1.

EXAMPLE 12

FIG. 2 depicts a laminated sheet product produced by providing the core layer 1 on one side of said sheet 2 and forming those into a sheet, as described in detail in Example 9.

EXAMPLE 13

As shown in FIG. 3, on the core layer 1 said sheet 2 was formed, and on which sheet a surface layer 3 comprising a non-foamed synthetic resin was further formed.

This sheet product is prepared by, for example, conducting powder coating of said composition onto the release paper or the steel belt, providing the core layer 1 on said composition, then forming those into a laminated sheet by heating at an increased pressure. The obtained laminated sheet is removed from the release paper or the steel belt and on said sheet 2 the non-foamed PVC sol layer is further provided and molded thermally, or a soft plastic film such as a PVC sheet, a polyethylene film and the like is fused by heating or bonded by adhesives, as the surface layer 3.

EXAMPLE 14

FIG. 4 shows a laminated sheet product in which on said sheet 2 the core layer 1 was provided, and on the core layer the surface layer 3 comprising a non-foamed synthetic resin was further formed.

This laminated sheet product is obtained, for example, in the same manner as in Example 13, by powder coating of said composition onto the release paper or the steel belt, providing the core layer 1 on the powder coating, heating those at an increased pressure to form into a laminated sheet. Thereafter the laminated sheet is removed from the release paper or the steel belt, on the core layer 1 the non-foamed PVC sol layer is formed thermally, otherwise soft plastic film such as a PVC sheet, a polyethylene film and the like are fused by heating or bonded by adhesives.

The sheet products thus obtained are not only superior in heat resistance and dimensional stability as compared with conventional ones using chemically foamed products as an intermediate layer, but very useful in use as a floor covering since the greatest defect of the conventional floor coverings that those are heavy is solved. Furthermore, because of resinous compositions made light being used as an intermediate layer, the intermediate layer per se has also rigidity, especially superior in abrasion resistance and heat resistance so that it is not only applicable to use for coverings requiring abrasion resistance, but manufacturing process is simplified to thus decrease the cost of products and to supply cheaper floor coverings. The floor coverings of the present invention, as mentioned earlier, employ no asbestos papers, in consequence, free of harmful damages to health and environments.

Hereinbelow, the performances of the present coverings are tabulated in Table 2 in comparison with those commercially available.

TABLE 2

|  | Floor coverings | | |
| --- | --- | --- | --- |
| Performances | Present invention | Chemical embossed foam type | Compact* type |
| Weight | Light | Light | Heavy |
| Abrasion resistance | Good | Bad | Better |
| Cigarette resistance** | Good | Worse | Better |
| Bending strength | Better | Not good | Not good |
| Soundproof effect | Normal | Normal | Normal |
| Cost | Normal | Economical | Expensive |

*Coverings which especially require superior abrasion resistance.
**Resistance against burning when a cigarette was dropped on the floor covering.

As can be understood from the results of Table 2, the present floor coverings are not only made lighter, superior in cigarette resistance and abrasion resistance, but are provided with functions satisfying bending strength and water resistance, as compared with conventional coverings.

EXAMPLE 15

| | |
| --- | --- |
| PCH-12 (Vcl-VAc copolymer, $\bar{p}$ = 1400, Average particle size: $1\mu$) | 70 parts by weight |
| PBM-10 (Vcl homopolymer, $\bar{p}$ = 1000, Average particle size: $25\mu$) | 30 |
| TCP (Tricresyl phosphate) | 70 |
| Silus Balloon (SANKILITE-Y02) | 100 |
| Stabilizer (Barium stearate) | 3 |

The foregoing composition was dry-blended by a Henshel style mixer to thus obtain a compound with good fluidity as powder. The compound was then applied by powder coating onto a steel plate treated with polytetrafluoroethylene in a thickness of 0.5 mm and on the powder coating a glass fibre non-woven fabric was provided in a density of 50 g/m$^2$, then those being subjected to the treatment for 2 minutes at 190° C. under a pressure of 15 Kg/cm$^2$. In the following way a floor coverng was made while using the obtained laminated sheet as a backing.

(Foamed sol composition)

| | |
| --- | --- |
| PSL-10 (Vcl homopolymer, $\bar{p}$ = 1000, Average particle size; $1\mu$) | 100 parts by weight |
| PBM-10 (Vcl homopolymer, $\bar{P}$ = 1000, Average particle size: $25\mu$) | 50 |
| DOP | 50 |
| Secondary plasticizer (alkylbenzene) | 5 |
| Blowing agent (azodicarbonamide) | 3 |
| TiO$_2$ | 2 |
| Blowing assistant (ZnO) | 1 |

(Non-foamed sol composition)

| | |
| --- | --- |
| PSH-10 (Vcl homopolymer, $\bar{p}$ = 1700, Average particle size: $1\mu$) | 70 parts by weight |
| PBM-B3 (Vcl homopolymer, $\bar{p}$ = 1000, Average particle size: $30\mu$) | 30 |
| DOP | 45 |
| TXIB (Texanol isobutylate) | 5 |
| Stabilizer (AC-118, produced by Adeka Argus Chem. Co., Ltd.) | 3 |

The foregoing compositions were blended and deaerated by an Ishikawa style grinder to thus obtain a foamed sol and a non-foamed sol, respectively.

On the side of the non-woven fabric of the backing the foregoing foamed sol is applied in a thickness of 0.3 mm and subjected to preliminary gellation at 170° C. for 2 minutes to provide a foamed layer. On the foamed layer the foregoing non-foamed sol was applied in a thickness of 0.2 mm and then subjected to preliminary gellatin at 170° C. for 2 minutes to thus form a surface layer (skin layer).

After measurement of the thickness of the preliminarily gelled layer, foaming was continued at 210° C. for 2 minutes. The foaming degree of the foamed layers was about 3.5 times and a light floor covering was produced. The obtained floor covering had a specific gravity of 0.75 and was superior in flexibility and dry touchness.

COMPARATIVE EXAMPLE 3

In accordance with a process disclosed in the Japanese Patent Examined Publication No. 41848/1972, a backing was prepared with a composition stated below.

| | |
|---|---|
| PSH-10 (PVC homopolymer, $\bar{p}$ = 1700, Average particle size: 1μ) | 100 parts by weight |
| DOP | 100 |
| CaCO$_3$ (average particle size: 2.1μ) | 150 |
| Stabilizer (Ca—Zn) | 3 |

A plastisol was obtained by blending the foregoing composition by an Ishikawa style grinder. The plastisol so obtained was applied onto a glass fibre non-woven fabric in a density of 50 g/m$^2$ in a thickness of 0.5 mm, then subjected to the treatment at 200° C. for 5 minutes. The laminated sheet so obtained was the same as that described in said publication and possible to serve as a backing.

On the surface of the non-woven fabric the foamed sol and the non-foamed sol described in Example 15 were applied, then subjected to gellation and foaming in the same way as in Example 15, thus a floor covering being provided. The foaming degree was 3.5 times and superior in uniformity of cells. The floor covering had a specific gravity of 1.55, very heavy and adhesive in the surface of the backing, though superior in flexibility, at which points it differed essentially from that obtained in Example 15.

The floor coverings obtained in Example 15 and Comparative Example 3 were compared and the results are shown in Table 3.

TABLE 3

| | Floor covering | |
|---|---|---|
| Performances | Present invention | Japanese Patent Examined Publication No. 41848/1972 |
| Specific gravity | 0.75 | 1.55 |
| Weight | Light | Very heavy |
| Strength | Superior | Superior |
| Touchness | Dry | Wet, adhesive |
| Adhesives | Free choice | Only adhesives for soft vinyls |
| Soundproof effect | Superior | Normal |
| Adiabatic effect | Superior | Normal |

As is apparent from the above comparison, the composition and molded product of the present invention, when used in a floor covering, produce an outstanding effect of making it lighter than the conventional coverings, for instance, if compared with those revealed in the Japanese Patent Examined Publication No. 41848/1972, can be reduced to a half or below in weight. (The specific gravity of the present floor coverings ranges from about 0.5 to about 0.8). Moreover, those are by far superior in respects of soundproof effect, adiabatic effect, bending strength, dry touchness, water resistance, dimensional stability, cold resistance and the like so that the present invention is capable of supplying floor coverings more advantageously as compared with the conventional ones.

What we claim is:

1. A polyvinyl chloride resinous molded sheet product comprising:
    (a) a polyvinyl chloride resinous molded sheet obtained by dry-blending at a temperature between 50° C. and 100° C., 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to form a sheet;
    (b) a layer laminated to one side of the sheet, said layer being selected from the group consisting of a glass fiber non-woven fabric, a synthetic fiber non-woven fabric and a victoria lawn; and
    (c) a surface layer laminated to the other side of the sheet, said surface layer comprising a non-foamed synthetic resinous layer.

2. A polyvinyl chloride resinous molded sheet product comprising:
    (a) a polyvinyl chloride resinous molded sheet obtained by dry-blending at a temperature between 50° C. and 100° C. 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to form a sheet;
    (b) a first layer which is provided on a surface of the sheet, said first layer being selected from the group consisting of a glass fiber non-woven fabric, a synthetic fiber non-woven fabric and a victoria lawn; and
    (c) a surface layer which is provided on said first layer, said surface layer comprising a non-foamed synthetic resinous layer.

3. A polyvinyl chloride resinous molded sheet product comprising:
    (a) a polyvinyl chloride resinous molded sheet obtained by dry-blending at a temperature between 50° C. and 100° C. 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to form a sheet;
    (b) a first layer which is provided on a surface of the sheet, said first layer being selected from the group consisting of a glass fiber non-woven fabric, a synthetic fiber non-woven fabric and a victoria lawn;
    (c) a foamed layer provided on said first layer and comprising polyvinyl chloride paste resinous foam; and
    (d) a surface layer provided on the foamed layer and comprising a non-foamed synthetic resinous layer.

4. A polyvinyl chloride resinous molded sheet product comprising:
    (a) a polyvinyl chloride resinous molded sheet obtained by dry-blending at a temperature between 50° C. and 100° C. 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to form a sheet;
    (b) a first layer which is provided on one surface of the sheet, said first layer being selected from the group consisting of a glass fiber non-woven fabric, a synthetic fiber non-woven fabric and a victoria lawn;
    (c) a foamed layer provided on the other surface of the sheet and comprising polyvinyl chloride paste resinous foam; and (d) a surface layer provided on the foamed layer and comprising a non-foamed synthetic resin.

5. A polyvinyl chloride resinous molded sheet product comprising:
   (a) a polyvinyl chloride resinous molded sheet obtained by dry-blending at a temperature between 50° C. and 100° C. 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to form a sheet;
   (b) a first layer which is provided on one surface of the sheet, said first layer being selected from the group consisting of a glass fiber non-woven fabric, a synthetic fiber non-woven fabric and a victoria lawn;
   (c) foamed layers provided on the first layer and on the other surface of the sheet and comprising polyvinyl chloride resinous foam; and
   (d) a surface layer provided on the foamed layer which is in contact with the sheet, said surface layer comprising a non-foamed synthetic resinous layer.

6. A polyvinyl chloride resinous molded sheet product comprising:
   (a) a polyvinyl chloride resinous molded sheet obtained by dry-blending at a temperature between 50° C. and 100° C. 100 parts by weight of a polyvinyl chloride resin having an average particle size of not more than 50 microns, 50 to 100 parts by weight of an inorganic cellular filler and 40 to 100 parts by weight of a plasticizer, then molding said blend under heat and pressure to foam a sheet;
   (b) a first layer which is provided on one surface of the sheet, said first layer being selected from the group consisting of a glass fiber non-woven fabric, a synthetic fiber non-woven fabric and a victoria lawn;
   (c) foamed layers provided on the first layer and on the other surface of the sheet, said formed layers comprising polyvinyl chloride resinous foam; and
   (d) a surface layer provided on the foamed layer which is in contact with said first layer, said surface layer comprising a non-foamed synthetic resinous layer.

7. The composite sheet of claim 1, 2, 3, 4, 5 or 6 wherein the thickness of said polyvinyl chloride resinous sheet containing a cellular filler is in a range of from about 0.1 to about 5 mm.

8. The composite sheet of claim 1, 2, 3, 4, 5 or 6, wherein the density of glass fibre non-woven fabrics, synthetic fibre non-woven fabrics or victoria lawns is in a range of from about 30 to 200 g/m$^2$.

9. The composite sheet of claim 3, 4, 5 or 6, wherein the thickness of the foamed layer is in the range of from about 0.3 to about 2.0 mm.

10. The composite sheet of claim 1, 2, 3, 4, 5 or 6, wherein the thickness of the surface layer is in the range of from about 0.2 to 0.5 mm.

11. The composition of claim 1, wherein the polyvinyl chloride resin comprises homopolymers of vinyl chloride or copolymers of vinyl chloride and at least one of other monomers copolymerizable therewith which are selected from the group consisting of vinyl esters such as vinyl acetate and vinyl propionate, acrylic or methacrylic esters, and olefinic monomers such as ethylene and propylene, having an average particle size ranging from about 0.2 to about 200$\mu$.

12. The polyvinyl chloride resinous molded sheet product of claim 1, 2, 3, 4, 5 or 6 wherein the cellular filler has an apparent specific gravity of about 0.01 to about 0.8 and an average size of about 1.0 to about 2000$\mu$.

13. The polyvinyl chloride resinous molded sheet product of claim 1, 2, 3, 4, 5 or 6, wherein the inorganic cellular filler is selected from the group consisting of Silus Baloon, Dia Balloon, Microballoon, pearlite and a mixture thereof.

* * * * *